US008868662B2

(12) United States Patent  
Curtin et al.

(10) Patent No.: US 8,868,662 B2
(45) Date of Patent: Oct. 21, 2014

(54) METHODS AND SYSTEMS FOR TRACKING SHARED CONTENT

(75) Inventors: Christopher M. Curtin, Acworth, GA (US); Richard L. Evans, Mableton, GA (US); Jeffrey S. Dernavich, Atlanta, GA (US); Scott M. Voigt, Atlanta, GA (US)

(73) Assignee: Silverpop Systems, Inc., Atlanta, GA (US)

( * ) Notice: Subject to any disclaimer, the term of this patent is extended or adjusted under 35 U.S.C. 154(b) by 661 days.

(21) Appl. No.: 12/481,825

(22) Filed: Jun. 10, 2009

(65) Prior Publication Data

US 2010/0318611 A1    Dec. 16, 2010

(51) Int. Cl.
*G06F 15/16* (2006.01)
*G06F 17/30* (2006.01)

(52) U.S. Cl.
CPC .............. *G06F 15/16* (2013.01); *G06F 17/30* (2013.01)
USPC ............................ 709/206; 709/227; 707/600

(58) Field of Classification Search
CPC ................................................ G06F 17/30882
USPC ............................ 709/203, 229; 707/10, 102
See application file for complete search history.

(56) References Cited

U.S. PATENT DOCUMENTS

2009/0234876 A1* 9/2009 Schigel et al. ................. 707/102
2009/0282052 A1* 11/2009 Evans et al. .................... 707/10

OTHER PUBLICATIONS

Lund, et al., "Social Bookmarking Tools (II): A Case Study—Connotea," D-Lib Magazine, Apr. 2005, vol. 11, No. 4, pp. 1-15.
Hughes, "The Facebook Blog, Sharing is Daring," http://web.archive.org/web/20070612184237/http://blog.facebook.com/blog.php?post =221 . . . , Oct. 27, 2006, pp. 1-2.
"Social Bookmarking," From Wikipedia, the free encyclopedia, http://web.archive.org/web/20080306093610/http://en.wikipedia.org/wiki/Social_bookmarking, Feb. 28, 2008, pp. 1-4.
"Social Connect FAQ Frequently Asked Questions about Communicating with Facebook Users through StormPost 4.0," Datran Media, Apr. 2008, pp. 1-4.
"Get Social with Your Audience, Reach Consumers in the Social Media Inbox," Datran Media/StormPost/Social Connect; http://www.skylist.net/features/socialconnect/, 2009, pp. 1-2.
"Social Bookmarking," From Wikipedia, the free encyclopedia, http://en.wikipedia.org/wiki/Socia_bookmarking, Jun. 24, 2009, pp. 1-4.

* cited by examiner

*Primary Examiner* — Glenford Madamba
(74) *Attorney, Agent, or Firm* — Kilpatrick Townsend & Stockton LLP

(57) ABSTRACT

Tracking content shared over a network is described. Content with a mailing identifier and a recipient identifier can be transmitted to a recipient. The mailing identifier and the content can be associated with the recipient identifier. A request from the recipient to provide an application with access to the content can be received. The request can include the mailing identifier and the recipient identifier. A web page can be generated. The web page can include the content and can be associated with a second recipient identifier and a link. The request and the second recipient identifier can be associated with the recipient identifier using a forward identifier. A request to access the web page by a recipient friend using the link and the application can be received. The request to access can be associated with the recipient identifier. Reports can be generated and outputted.

20 Claims, 11 Drawing Sheets

FORWARD_RECIPIENTS

| forward_id | mailing_id | recipient_id | job_id | report_id | list_id |
|---|---|---|---|---|---|
| 99 | 1000 | 2001 | 1001 | 1001 | 999 |
| 100 | 1000 | 2002 | 1001 | 1001 | 999 |

RECIPIENT

| Recipient_id | email | domain |
|---|---|---|
| 2000 | john@email.com | email.com |
| 2001 | unknown1@email.com | email.com |
| 2002 | unknown2@email.com | email.com |

FORWARD_REQUEST

| forward_id | mailing_id | sender_id | sender_email |
|---|---|---|---|
| 99 | 1000 | 2000 | john@email.com |
| 100 | 1000 | 2001 | unknown1@email.com |

EVENT_TRACKING

| mailing_id | report_id | job_id | recipient_id | event_code | event_ts |
|---|---|---|---|---|---|
| 1000 | 1001 | 1001 | 2000 | OP | 7/4/2009 11:00 AM |
| 1000 | 1001 | 1001 | 2000 | FWD | 7/4/2009 11:01 AM |
| 1000 | 1001 | 1001 | 2001 | OP | 7/5/2009 9:00 AM |
| 1000 | 1001 | 1001 | 2001 | CLICK | 7/5/2009 9:02 AM |
| 1000 | 1001 | 1001 | 2001 | FWD | 7/5/2009 9:03 AM |
| 1000 | 1001 | 1001 | 2002 | OP | 7/5/2009 10:00 AM |

Figure 4 facebook

John Doe posted a link.

The Acme Friends & Family Sale Starts Thursday!
Source: share.rm02.net

UP TO 30% OFF*

Acme's Friends & Family Sales is open to all of your friend's, including your social network friends.

"Hey guys. Here's a special deal from Acme."

Add Comment

Figure 9

METHODS AND SYSTEMS FOR TRACKING SHARED CONTENT

FIELD OF THE INVENTION

The present invention relates generally to tracking content shared over a network and, more particularly, to tracking electronic mail messages shared to others using a web-based application.

BACKGROUND

Web-based applications that allow members to share user-generated content are prevalent. Examples of such applications include social networking applications, including content-sharing web sites such as the YouTube™ site. Social networking applications generally are online communities that allow members to interact and share information. Some social networking applications focus on a particular category of information-sharing or human relationship, such as interacting with current or former classmates or business networking. Additional examples of social networking applications include the Facebook™, MySpace™, Digg™, Del.icio.us™, Digg™, Twitter™, Linkedin™, Nexopia™, Ning™, Skyrock™, Orkut™, YAHOO! Buzz™, and Friendster™ applications. The content that may be shared using these types of applications includes video, images, text, hyperlinks, or a combination of these types of content.

Some social networking applications allow members to share content using hyperlinks embedded in content delivered from a third party. For example, a news article on news web site such as www.nytimes.com may be associated with a hyperlink that allows a viewer to share the article using a social networking application. The viewer clicks the link and logs-on to a web site associated with the social networking application to have the article or a link to the article appear on the viewer's page provided by the social networking application for others to view or access.

Similar to a web page, an electronic communication, such as an email message, can include content with an embedded link to allow a recipient of the communication to share the content using a social networking application. For example, an email that includes an advertisement and an embedded link for sharing the advertisement is transmitted to a recipient's email address. The recipient clicks the embedded link to share the content using the social networking application. "Sharing" can include having the advertisement or a link to the advertisement displayed on the recipient's social networking web page and may be referred to as "forwarding" or a "forward" to a social networking application. Such sharing capabilities can be a powerful way to expose others to an advertising campaign, news article, or other type of content. Those with relationships with the recipient on the social networking application, for example, may be more receptive to an advertisement or other message if it is from someone with whom they have a relationship, such as with the recipient.

Thus, a recipient that has a propensity for sharing content from messages using a social networking application can be a valuable asset in a content delivery strategy. However, it can be difficult to track content being shared using a social networking application and to identify a recipient that shares content. Accordingly, systems and methods for tracking shared content and identifying a recipient that is likely to share content are desirable.

SUMMARY

In an embodiment, a message is transmitted to a recipient. The message includes content and has a mailing identifier and a recipient identifier. The mailing identifier and part of the content are associated with the recipient identifier. The recipient identifier is associated with the recipient. A request from the recipient to share part of the content to an application is received. The request includes the recipient identifier and the mailing identifier. A web page is generated in response to the request. The web page includes part of the content and is associated with a second recipient identifier and a link. A link to the web page is provided to the application. The second recipient identifier is associated with a forward identifier. The part of the content is selected using the recipient identifier and the mailing identifier from the request. A request to access the web page by a recipient friend using the link and the application can be received. The forward identifier can be used to associate the second recipient identifier with the recipient identifier. A report is generated based on the recipient identifier associated with the second recipient identifier using the forward identifier. The report can identify the request from the recipient to share part of the content and the request to access the web page by the recipient friend. The report is outputted.

This illustrative embodiment is mentioned not to limit or define the invention, but to provide examples to aid understanding of the inventive concepts disclosed in this application. Other aspects, advantages, and features of the present invention will become apparent after review of the entire application, including the following sections: Brief Description of the Drawings, Detailed Description, and Claims.

BRIEF DESCRIPTION OF THE DRAWINGS

FIG. 4 illustrates an example of database associations that can be used to track shared content and identify a recipient that shares content according to one embodiment of the present invention.

FIG. 9 is a screen shot of shared content on web site provided by a social networking application according to one embodiment of the present invention.

DETAILED DESCRIPTION

Certain aspects and embodiments of the present invention relate to tracking shared content and identifying a recipient that is likely to share content or a recipient that has shared content. Some embodiments can be used to develop a reward mechanism by which recipients are rewarded for sharing content by tracking shared content. Content may be delivered to recipients in an electronic communication, such as in an email message. A "recipient" as used herein is an individual or a representative of an entity that receives content and that can elect to share at least part of the content using a social networking application for access by the recipient's friends. A "recipient's friend" as used herein is an individual or a representative of an entity that is associated with the recipient by the social networking application and that is capable of accessing at least part of the content shared by the recipient.

In some embodiments, database associations are used to track content that has been shared by a recipient and access to the shared content by the recipient's friends. The associations can be used to determine a number of times content was accessed by the recipient's friends and by friends of the recipient's friends. Reports can be generated from tracking the shared content using associations in the database. The reports can be used to identify a recipient that shares content and the number of accesses to content that was shared by the recipient. Reports can be used to identify "influencers." "Influencers" are recipients that have shown a propensity to share at least some of the content transmitted to them and/or are recipients whose friends have shown a propensity to view the content and select links included in the content. In addition, the reports can be used to develop a reward mechanism to reward influencers that share content and offer incentives for influencers to share content.

Illustrative System Implementation

Figure 1:
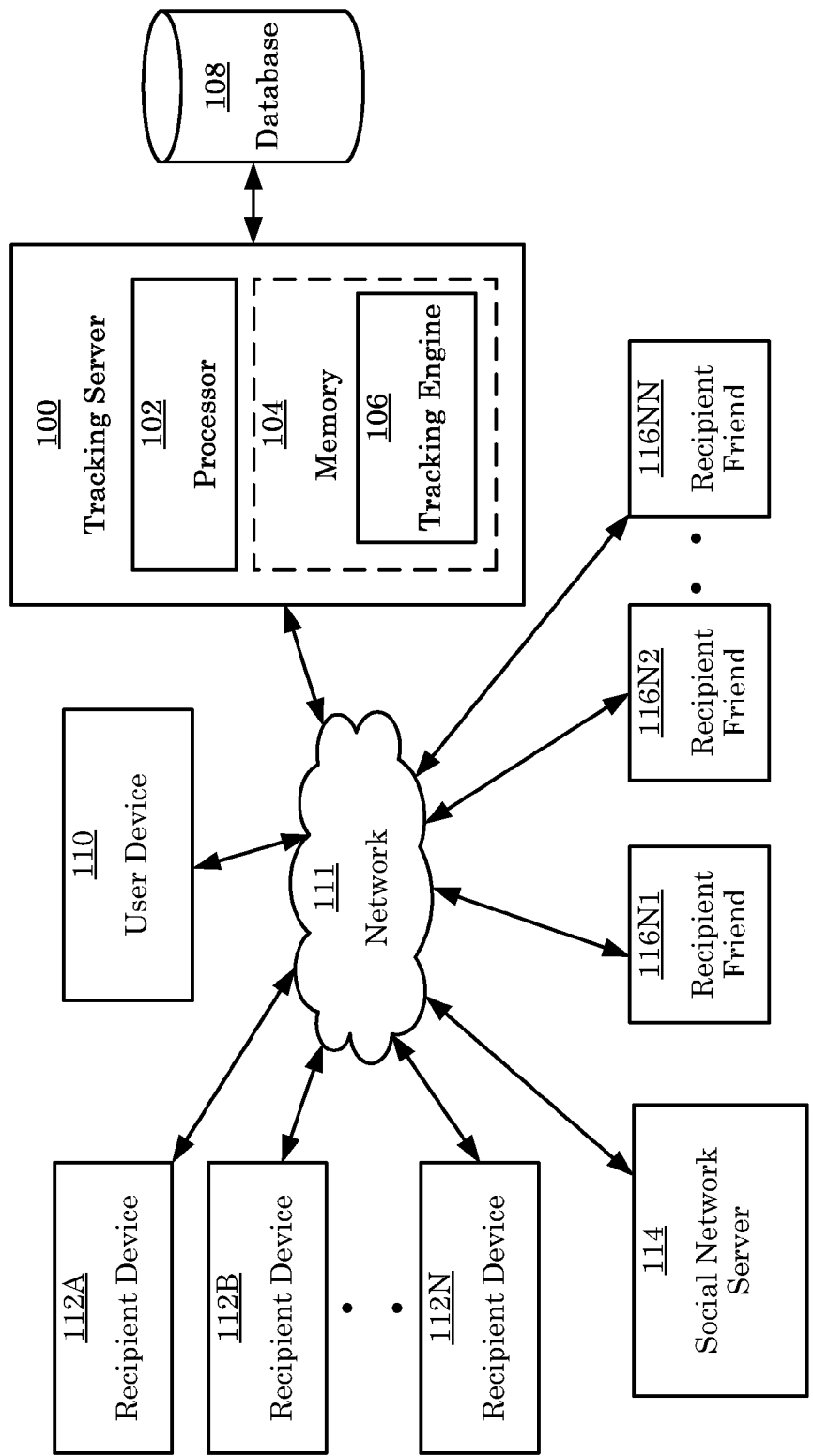
FIG. 1 illustrates a system for tracking shared content and identifying a recipient that shares content according to one embodiment of the present invention.

Methods according to various embodiments of the present invention may be implemented on a variety of different systems. An example of one such system is illustrated in FIG. 1. The system includes a tracking server 100 that includes a processor 102 capable of executing computer code stored in a computer-readable medium, such as memory 104. The computer code stored in memory 104 can include a tracking engine 106 that, when executed by the processor 102, can transform the tracking server 100 from a general server to a specialized server device that can perform various methods according to various embodiments of the present invention. For example, the tracking engine 106 may be a computer program product that is stored on the computer-readable medium and is executable by the processor 102.

Memory 104 may be any type of computer-readable medium. Examples of memory 104 include magnetic storage media, optical storage media, and semiconductor storage media. Examples of semiconductor storage media include dynamic random access memory (DRAM), static random access memory (SRAM), read-only memory (ROM), and flash memory.

The tracking server 100 may be in communication with database 108. In some embodiments, the database 108 is a relational database that is associated with a database server. In other embodiments, the database 108 is a flat file database. The database 108 can include a computer-readable medium embodying code representing various types of data and associations between the data. Examples of data that can be stored in database 108 include recipient lists, recipient email addresses, content, an indication of shared content, an indication that a recipient friend accessed the shared content, an identification of one or more recipients or recipient friends that have shared content, interactions of recipient friends with the content, and reports. Recipient lists and recipient email addresses may be received from a user that is a customer interested in implementing an advertising campaign or promulgating content using the features offered by the tracking server 100 and database 108.

The tracking server 100 and database 108 may be implemented as one device, two separate but connected devices, or more than two devices. For example, the tracking server 100 can include the database 108 in memory 104. In other embodiments, the tracking server 100 is connected to the database 108. For example, the tracking server 100 may be connected to the database 108 over a network, such as an intranet or the Internet. In one embodiment, the tracking server 100 is an HP Intel server provided by Hewlett-Packard Co., Palo Alto, Calif. and the database 108 is an Oracle™ database provided by Oracle Corp., Redwood Shores, Calif.

The tracking server 100 may be in communication with other devices. For example, a web server (not shown) may be included in the tracking server 100 or coupled to the tracking server 100 to allow the tracking server 100 to communicate using a network 111.

In some embodiments, the tracking server 100 includes more than one device that are separate and that, when working in concert, are capable of performing various methods according to various embodiments of the present invention. In one embodiment, the tracking server 100 includes a database server, multiple content creation servers, multiple email delivery servers, multiple reporting servers, and multiple servers that can track actions. The database server can manage data and relationships between data in the database 108. The content creation servers can create content to include in the email messages and provide the content to the email delivery servers. The email delivery servers can send email to recipients' Internet Service Provider for delivery to recipient devices controlled by the recipients. The servers that can track actions can receive requests to share content from recipients or recipient friends, interact with social networking applications, interact with the database 108 to provide instructions to create anonymous recipient identifiers, other identifiers, and relationships between the identifiers, and generate a web page that includes the content. The servers that can track actions may also receive requests by recipient friends to access the web page and direct the database 108 to store the access and associate with the recipient identifiers.

The database server, email delivery servers, reporting servers, and servers that can track actions may be behind load balancers that provide redundancy and volume support. The database server, content creation servers, reporting servers, and servers that can track actions may have access to database 108. The multiple content creation servers, multiple email delivery servers, multiple reporting servers, and multiple servers that can track actions may include up to four of each server type, although any number of each type of server can be used.

The system shown in FIG. 1 can be used to communicate, directly or indirectly, with other devices over the network 111. Examples of a network 111 include the Internet and an intranet. Devices can include a user device 110 and one or more recipient devices 112A-N. The user device 110 may be a processor-based device associated with a user that is a customer interested in implementing an advertising campaign or promulgating content using the features offered by the tracking server 100 and database 108. The user device 110 may be capable of providing data to the tracking server 100 and receiving reports from the tracking server 100. Examples of data include recipient lists, recipient contact information, such as an email address, and content. In some embodiments, the tracking server 100 is connected directly to the user device 110 and communication occurs between the two devices without using the network 111.

Each of recipient devices 112A-N may be a processor-based device that, upon receiving a command from a recipient, can execute code associated with an application stored on the device to allow the recipient to receive communications from the tracking server 100 and access a social network server 114 over the network 111. The social network server 114 may be a processor-based device that includes a social networking application. The social networking application may be a web-based application that facilitates content sharing among members of the web-based service. When executed by a processor, the social networking application can provide access to recipients over a network, receive content provided by recipients, and provide recipient friends with access to the content. FIG. 1 shows recipient friends 116N1-116NN of the recipient associated with recipient device 112-N. However, each of the recipients associated with the recipient devices 112A-N may be associated with multiple recipient friends. In addition, each of the recipient friends 116N1-116NN may each be associated with additional recipient friends (not shown) that can access information from the social network server 114 associated with the social networking application.

Embodiments of the tracking server 100 can communicate with the recipient devices 112A-N to receive a request to share content that was transmitted to the recipient devices 112A-N in a message, such as an email message. The tracking server 100 can generate content that may be similar to the message content for sharing on the social networking application, where recipient friends 116N1-116NN can access the shared content. The tracking server 100 may track the share requests and the access by recipient friends 116N1-116NN to identify one or more of the recipients as "influencers" to which to offer incentives and rewards for helping to promulgate an advertising campaign, news article, or other content publishing strategy.

Illustrative Methods for Tracking Shared Content

Figure 2:
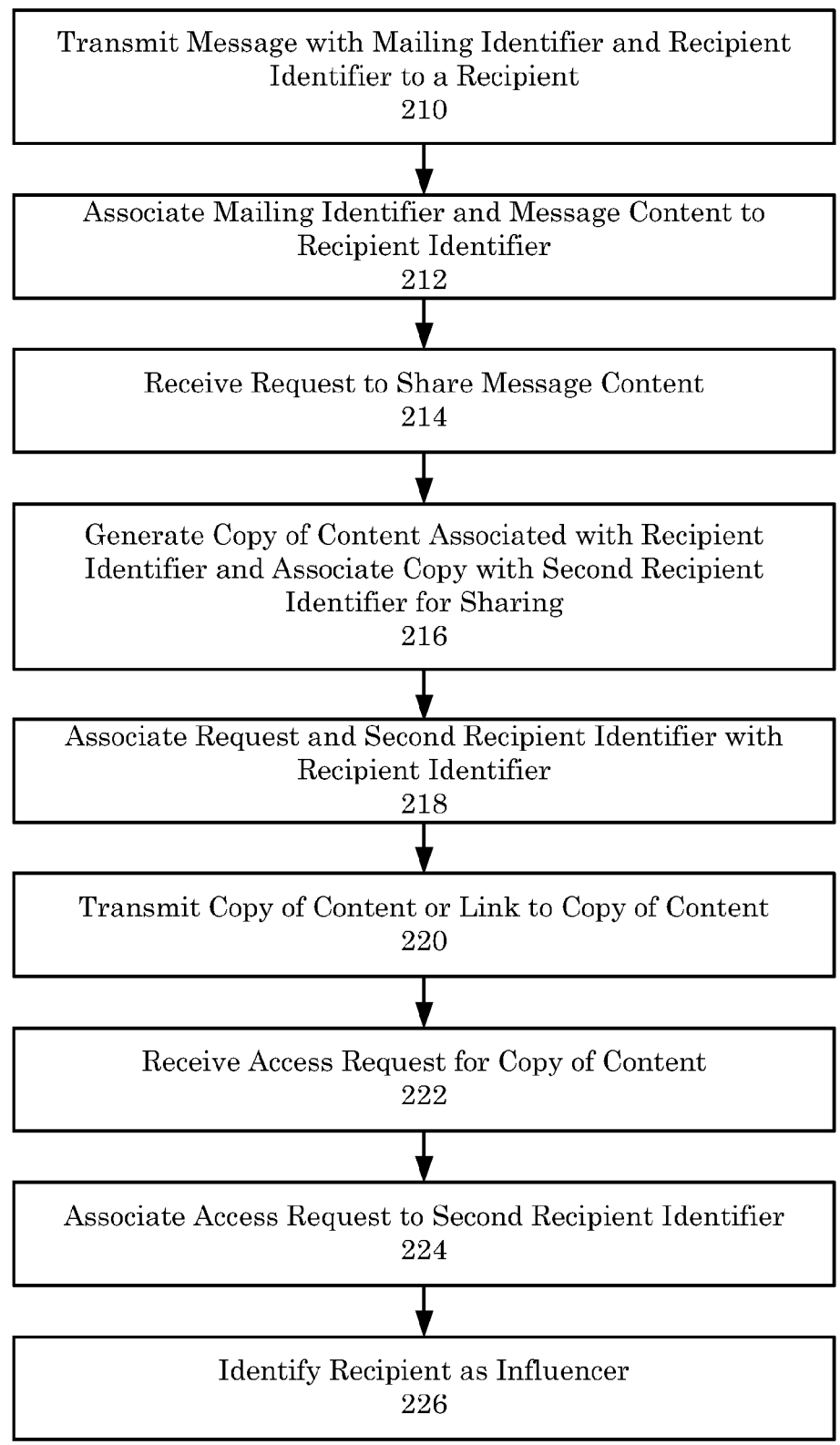
FIG. 2 illustrates a process for tracking shared content and identifying a recipient that shares content according to one embodiment of the present invention.

Various methods according to various embodiments of the present invention can be used to track shared content and identify recipients that share content. FIG. 2 illustrates one embodiment of a method for tracking shared content. For purposes of illustration only, the elements of this method are described with reference to the system depicted in FIG. 1 and illustration shown in FIG. 3. Other implementations are possible.

In block 210, the tracking server 100 transmits a message with a mailing identifier and a recipient identifier to a recipient. The recipient identifier may be a numerical or an alphanumerical code that is associated with the recipient and stored in the database 108. The message may be transmitted using email or other messaging technologies. The message can include content such as an advertisement, an article, or video. An email address associated with the recipient may be stored in the database 108 and the tracking server 100 can transmit the message to the recipient by sending the message to the recipient's email address. In some embodiments, the message is dynamically generated based on information received from the user about the recipient. For example, the recipient's name, email address, or other personal information, such as a frequent flyer number, loyalty club number, may be stored in database 108 and associated with the recipient identifier. In addition, portions of the content may be stored in the database 108. The tracking engine 106 can use the personal information of the recipient to select content from the database 108 and generate an email message containing personalized content. The recipient can use the recipient device 112A to receive and review the content transmitted by the tracking engine 106.

In some embodiments, the content of the message is a hypertext markup language (HTML) document with content represented by pictures, text, and embedded links. One of the embedded links may be an option that the recipient can select to share the content of the message through a social networking application.

In block 212, the tracking server 100 associates the mailing identifier and at least part of the content to the recipient identifier in the database 108. In some embodiments, the recipient identifier is associated with at least part of the content by a pointer associated with the recipient identifier that is associated with the location of the content in the database 108. The mailing identifier may be a numerical or an alphanumerical code representing the identification of the message. Each message that includes at least part of the same content may be associated with the same mailing identifier. For example, a message may be sent to several different recipients. The message can include an advertisement that is included in each message and portions that are different for each recipient, such as a salutation personalized for each recipient. Even though each message may be different because of the personalization, the messages are associated with the same mailing identifier because at least part of the content—the advertisement in this example—is the same for each recipient. The recipient identifier is the same recipient identifier embedded in the message to the recipient. Each recipient can be associated with a different recipient identifier.

In some embodiments, the message is associated with additional identifiers. For example, the message may be associated with a report identifier and a job identifier, in addition to the mailing identifier and the recipient identifier. The report identifier may be a numerical or an alphanumerical code that represents a batch in which the message was processed. Messages may be generated and transmitted in batches. The messages may include different content, and thus are associated with different mailing identifiers. The report identifier is associated with the batch to allow tracking of batch execution. The job identifier may be a numerical or an alphanumerical code that represents when the message was sent to the recipient. The report identifier and job identifier can be used to track and organize messages to the same recipient with the same content that may be sent at different times.

In block 214, the tracking server 100 receives a request to share the message content from the recipient device 112A operated by the recipient. For example, the recipient can use an input device, such as a mouse, coupled to the recipient device 112A to click an embedded link associated with an option in the message. The recipient may also select one or more social networking applications to share the content. For example, the embedded links may provide one or more social networking applications that the recipient can select. By selecting the link and one or more of the social networking applications, the recipient causes a request to be generated and provided to the tracking server 100.

The request can include the recipient identifier, mailing identifier, and an identification of a social networking application to which to share the message content. In some embodiments, the message content includes an embedded link that is selectable by a recipient to cause the request to be generated. The embedded link may be associated with options that represent one or more commonly used social networking applications to which the recipient can select to share the message content. When the user selects the link and selects a social networking application to which to share the message content, the request is transmitted to the tracking server 100 for processing. The request can automatically include the mailing identifier and the recipient identifier.

In block 216, the tracking server 100 generates a copy of the content associated with the recipient identifier and associates the copy to a second recipient identifier for sharing on the social networking application. The second recipient identifier may be a numerical or an alphanumerical code that represents an anonymous recipient. The second recipient identifier can be associated with the recipient identifier. The copy of content may be generated by accessing the database 108 to determine the content associated with the recipient identifier and the mailing identifier, replicating the content, and storing the replicated content as a copy. The type of social networking application to which the content is to be shared may be used to determine the format of the generated content. In some embodiments, the copy of content includes the second recipient identifier as embedded data.

In some embodiments, the copy of content is generated with portions that were personalized for the recipient replaced by portions that are not personalized. In other embodiments, the tracking server 100 may remove other portions of the content included in the message to the recipient. For example, the message content may include an embedded link that allows the recipient to request an "opt-out" of future emails. The tracking server 100 can remove the "opt-out" feature when generating the copy of content to be shared. The "opt-out" feature may be avoided to prevent a recipient friend or a friend other than the recipient to select the "opt-out" feature, which may cause the "opt-out" to be associated with the recipient. In other embodiments, the "opt-out" feature is included in the copy of content.

Figure 3:
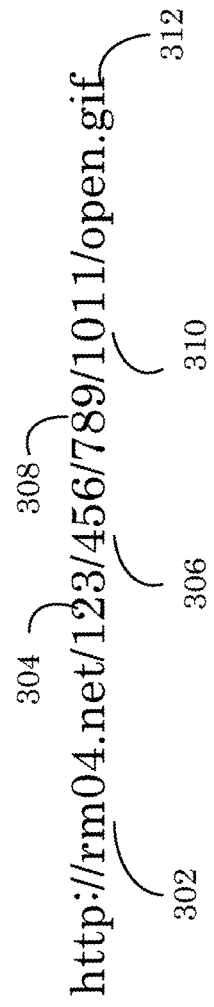
FIG. 3 illustrates a uniform resource locator (URL) of a location for content that is shared according to one embodiment of the present invention.

In some embodiments, the copy of content is generated as a web page that is accessible by a uniform resource locator (URL). The URL may be generated based on the recipient identifier of the recipient that selected to share the content. Additional identifiers, such as mailing, job, and report identifiers, may be used to generate the URL of the generated content. An example of a URL of generated content is shown in FIG. 3. One or more elements may represent the URL. The elements can include a domain 302 of the server that hosts the web page that includes the generated content, a mailing identifier 304, a recipient identifier 306, a report identifier 308, a job identifier 310, and a file name 312. The mailing identifier 304, recipient identifier 306, report identifier 308, and job identifier 310 may be represented using numerical or alphanumerical codes that are associated in the database 108. The file name 312 may be any type of name that is administratively convenient and may be associated with a file type that may be any type of file that is displayable on a web page. The web page can be saved in database 108.

In other embodiments, the copy of content is generated as an HTML message and is provided to the social networking application for display. The HTML message may include an embedded link that causes the social networking application to send a notification to the tracking server 100 when a recipient friend accesses the content directly from the social networking application.

In block 218, the tracking server 100 associates the second recipient identifier with the recipient identifier in the database 108. In some embodiments, the tracking server 100 receives an indicator that represents the request to share content using the social networking application. The indicator can be associated with the recipient identifier. For example, the indicator may be a forward identifier that indicates the recipient shared the content. In other embodiments, the association of the second recipient identifier with the recipient identifier can represent a request made by the recipient to share the content.

In block 220, the tracking server 100 transmits the copy of content or a link to the copy of content to the social networking application. In some embodiments, the tracking server 100 calls an Application Programming Interface (API) provided by the social networking application and provides the URL of the web page to it. The social networking application may make a call to the tracking server 100 to receive the web page and create a thumbnail representing the web page or part of the web page. The social networking application can display the link, the copy of content, and/or a thumbnail representation of the copy of content on a web page associated with an account of the recipient. For example, the social networking application can display a selectable button with "share" on it that, when selected by the recipient, causes the social networking application to display the link to the web page and thumbnail, if available.

The social networking application can allow the recipient's friends to access the copy of content or the link. In some embodiments, the tracking server 100 transmits the link associated with the copy of content. The link may be the URL that the tracking server 100 generated and that represents the location of the copy of content on the network 111. For example, the copy of content may be a web page hosted by the tracking server 100 at a location on the network 111 represented by the URL. In other embodiments, the copy of content is hosted by a third-party server instead of the tracking server 100. A recipient friend can select the link displayed on the social networking application to request access to the web page that includes the copy of content.

In block 222, the tracking server 100 receives a request to access the copy of content from a recipient friend. For example, the recipient friend may select the link displayed on a web page of the social networking application that is associated with the recipient to "open" the web page associated with the link. The request may be generated when the recipient friend selects the link provided to the social networking application. After receiving the request, embodiments of the tracking server 100 can provide the copy of content at the link to the recipient friend. In some embodiments, the request is generated when the recipient friend selects an option provided by the social networking application to access the copy of content content. The request can include the second recipient identifier and the mailing identifier associated with the copy of content.

In block 224, the tracking server 100 associates the request to access the copy of content from the recipient friend to the second recipient identifier in the database 108. The database 108 includes associations indicating that the recipient shared message content and that the shared content was accessed by a recipient friend. In block 226, the tracking server 100 generates a report to provide the user with information indicating that the message content was shared and that the shared content, which is a copy of the message content, was accessed by a recipient friend. The recipient can be identified using his or her email address, or other personal information, and provide the user with an opportunity to approve providing incentives or rewards to the recipient for sharing content and for sharing content that was accessed by a friend of the recipient. In some embodiments, the recipient is identified as an "influencer."

The web page may include embedded links, such as a link to share the content and/or a link for a web page hosted by a third party. For example, the user may host a web page that includes additional information or products associated with the information in the shared content. A recipient friend can select the link for the web page hosted by the third party and receive the web page. Embodiments of the tracking server 100 are configured to detect a "click" that represents a recipient friend accessing the web page hosted by the third party and associate that "click" with the second recipient identifier in the database 108. The click may be associated to the recipient identifier through the association of the second recipient identifier with the recipient identifier in the database 108. When a recipient friend selects the link to share the content, a third recipient identifier can be created and associated with the second recipient identifier in the database. Friends of the recipient friend may access the content and those accesses, clicks, and other activity can be tracked as explained above.

In addition, the features disclosed in blocks 222 and 224 can be repeated for each recipient friend that requests access to the copy of content. The database 108 can store these associations and the report can reflect the number of times the copy of content was accessed by friends of the recipient. In some embodiments, the label "influencer" may be associated with threshold criteria that a recipient must meet before being considered as an "influencer." Examples of threshold criteria include the number of messages shared by the recipient and the number of access requests received because of the recipient sharing the content. Furthermore, the recipient can share the content to more than one social networking application using a link embedded in the message. In some embodiments, each share by the recipient to a different social networking application can be associated to the recipient. The database can include relationships showing that a recipient shared content three times, for example, if the recipient shares the content to three different social networking applications.

Sharing by Multiple Degrees of Separation

In some embodiments of the present invention, the tracking server 100 can associate requests to share message content by recipient friends and access to the message content by friends of the recipient friends. The associations may allow the tracking server 100 to identify a recipient that helps to promulgate message content to several people, including those that may not be direct recipient friends, but may be one or more degrees removed from the recipient in the relationships managed by the social networking application. FIG. 4 illustrates one embodiment of associations in database 108 that provide for such tracking.

In FIG. 4, the recipient is represented with a recipient identifier of 2000 in the column labeled "Recipient_id" in the "RECIPIENT" table. The recipient identifier 2000 is associated with an email address (shown as john@email.com) and the domain name of the email account. When the recipient requests to share (also referred to as "forward") the content associated with mailing identifier 1000, the request is associated with the recipient identifier in the "FORWARD_REQUEST" table. The recipient identifier may be listed under the column "sender_id" to track the recipient as the sender of the content. The recipient identifier is associated with a forward identifier (99 in the column labeled "forward_id") that facilitates an association between the content shared by the recipient and the access by the recipient's friends.

When the recipient requests to share the content, a second recipient identifier is created in the "RECIPIENT" table. The second recipient identifier is shown in FIG. 4 as 2001 and is associated with an unknown email address (unknown1@email.com). An entry is also created in the "FORWARD_RECIPIENTS" table indicating that the message content (mailing identifier 1000) was shared by a recipient and is accessible to a recipient friend (represented by second recipient identifier 2001). The database can maintain the associations between data in the "RECIPIENT," "FORWARD_RECIPIENTS," AND "FORWARD_REQUEST" tables. Because the forward identifier is associated with the recipient identifier (2000) of the recipient, the tracking server 100 can determine that the recipient shared content that was then accessible to a recipient friend.

The recipient friend may also elect to share the message content. For example, the content (associated with mailing identifier 1000) accessed by the recipient friend (second recipient identifier 2001) may include an embedded link that allows the recipient friend to request to share the content on a web page in the social networking application associated with the recipient friend. When the recipient friend (second recipient identifier 2001) requests to share the message content, the request is associated with the second recipient identifier (2001) in the "FORWARD_REQUEST" table. The second recipient identifier (2001) is associated with a forward identifier 100. In addition, a third recipient identifier is created in the "RECIPIENT" table. The third recipient identifier is shown in FIG. 4 as 2002 and is associated with an unknown email address (unknown2@email.com). An entry is also created in the "FORWARD_RECIPIENTS" table associating the message content (mailing identifier 1000) with a third recipient identifier (2002) as a result of the recipient friend sharing the content as related by forward identifier (100).

An "EVENT_TRACKING" table may be included in the database to facilitate tracking of events associated with the recipient. Examples of events include content sharing, "opens" that include recipient friends or other social networking application participants receiving the shared content, and "clicks" that include recipient friends or other social networking application participants selecting a link embedded with the content to access a web page hosted by a third party.

For example, when an original recipient (associated with recipient identifier 2000) receives content and opens it, a first row is created in the "EVENT_TRACKING" table. The row includes the mailing identifier, report identifier, job identifier, and recipient identifier of the original recipient. The row also includes an event code of "OP" that represents an open of the content. It also includes time and date of the event. When the original recipient (recipient identifier 2000) elects to share the content, the tracking server 100 creates a web page that includes a copy of the content and a second row is created in the "EVENT_TRACKING" table. The second recipient identifier (2001), as stated above, can be an anonymous recipient identifier that is created with the recipient shares the content. The second row includes, associated with the recipient identifier 2000, the event code of "FWD" that represents a share or forward of the content to a social networking application, along with a time and date of the event.

When a recipient friends selects the link on the social networking web page and receives or "opens" the web page containing the content, a third row is created in the "EVENT_TRACKING" table. The third row includes the second recipient identifier (2001) associated with an event code of "OP" that represents an open of the content, along with a time and date of the event. When the recipient friend clicks an embedded link in the content to request a web page hosted by a third party (a web page hosted by the user for example), a fourth row is created in the "EVENT_TRACKING" table. The fourth row includes the second recipient identifier (2001) associated with an event code of "CLICK" that represents a click on an embedded link in the web page, along with the time and date of the event.

When a recipient friend elects to share the content on the recipient friend's web page hosted by the social networking application, a fifth row is created in the "EVENT_TRACK- ING" table. A third recipient identifier (2002) can be created when the content is shared by the recipient friend. The fifth row includes the second recipient identifier associated with an event code of "FWD" that represents a share or forward of the content to a social networking application, along with a time and date of the event.

When a friend of the recipient friend selects a link on the social networking application to receive or open the shared content, a sixth row is created in the "EVENT_TRACKING" table. The sixth row includes the third recipient identifier (2002) associated with an event code of "OP" that represents an open of the content, along with a time and date of the event. Additional events, such as sharing content, opening of content, and clicking embedded links in the content can be recorded in the "EVENT_TRACKING" table. The "EVENT_TRACKING" table, along with the "FORWARD_RECIPIENTS" and "FORWARD_REQUEST" tables, can be used to relate these events to the recipient.

For example, because the forward identifier is associated with the second recipient identifier (2001) of the recipient friend, and the share by the recipient friend is associated with the recipient identifier (2000), the tracking server 100 can determine that the recipient shared content that was then accessible to a friend one degree removed from the recipient. The database associations can be used to track share requests and content access through many levels of relationships maintained by the social networking application. The database associations can be used to identify the recipient as a person or entity that provides the capability of providing the content to many different recipients, even if the recipients are not directly related to the original recipient by the social networking application.

Figure 5:
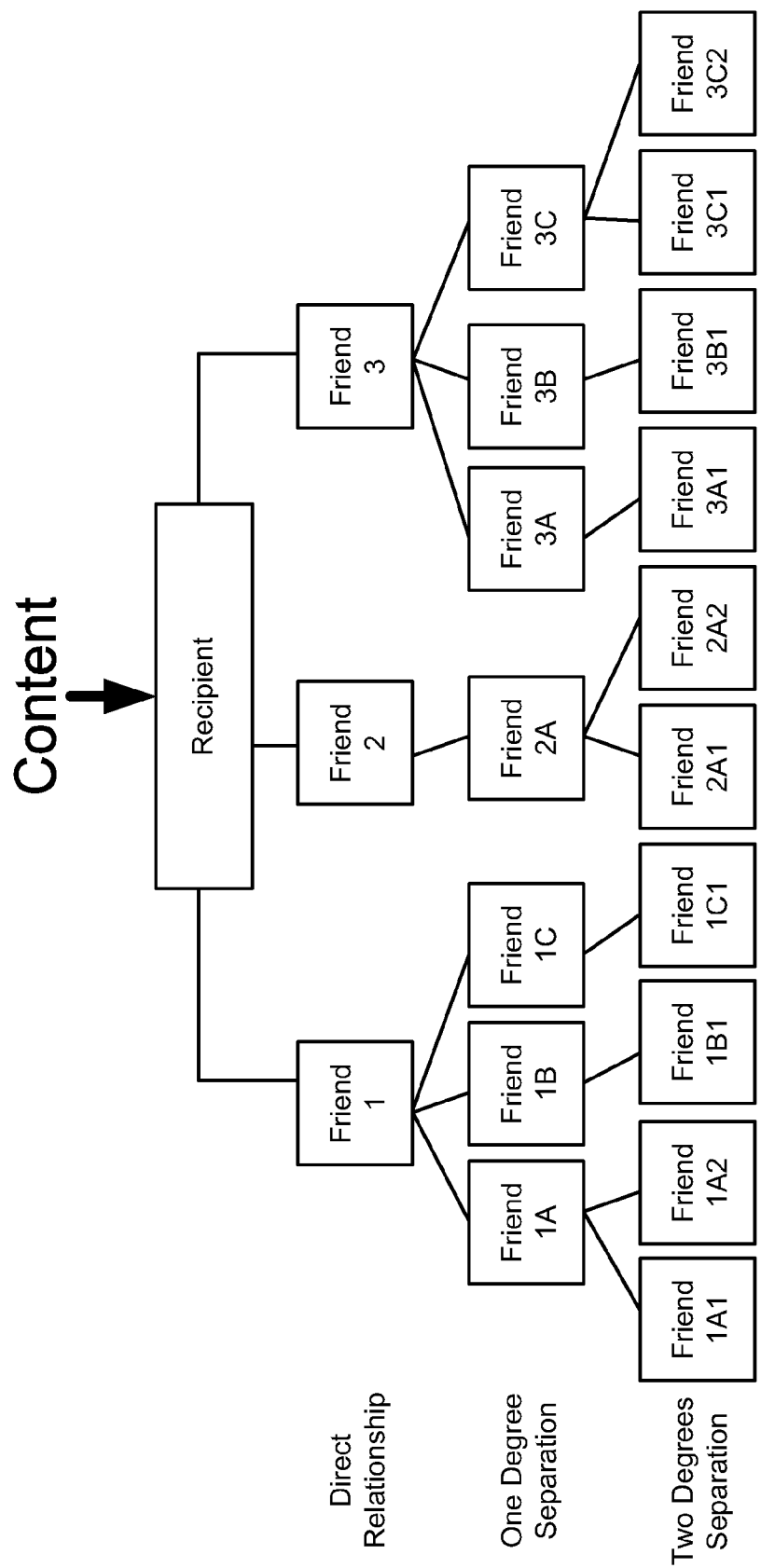
FIG. 5 illustrates an example of content sharing to friends without a direct relationship to a recipient according to one embodiment of the present invention.

FIG. 5 illustrates the potential promulgation of content that certain embodiments of the present invention provide. A recipient can share content on a web page hosted by a social networking application. A link, thumbnail, combination, or other representation of the shared content may be accessible to recipient friends who have a direct relationship with the recipient on the social networking application. A recipient friend can select the link, for example, to receive a web page containing a copy of content sent to the recipient. The copy of content can include an embedded link that allows a recipient friend to share the content using a social networking application.

FIG. 5 shows three friends that have a direct relationship with the recipient and that have shared the content on a social networking website after the recipient shared the content on a social networking website. Each of the friends can share the content with their friends who are one degree of separation removed from the recipient. FIG. 5 shows friends of the recipient friends who are one degree of separation from the recipient that have shared the content by accessing the link embedded in the content and shared it using the social networking application. Friends of the one degree of separation friends can access the shared content. FIG. 5 shows friends who are two degrees of separation from the recipient that have shared the content by accessing the link embedded in the content and shared it using the social networking application. Sharing content can continue to fan out to additional levels beyond those illustrated. Certain embodiments of the present invention can track such sharing to identify the recipient as an influencer that can result in content being shared to many different people or entities. The recipient may be targeted with particular messages, rewards, or incentives to continue sharing content received by the recipient since the recipient sharing content results in many people or entities being exposed to the content.

EXAMPLES

The following describes examples of implementing certain embodiments of the present invention to track content sharing and to identify a recipient that may be an influencer. The examples are described with reference to the functional block diagram of FIG. 6 and screen shots illustrated in FIGS. 7-11. Other implementations of the inventive concepts that are not described through these examples, however, are also possible and these descriptions should not be construed as limiting the invention to the particular examples described.

Figure 6:
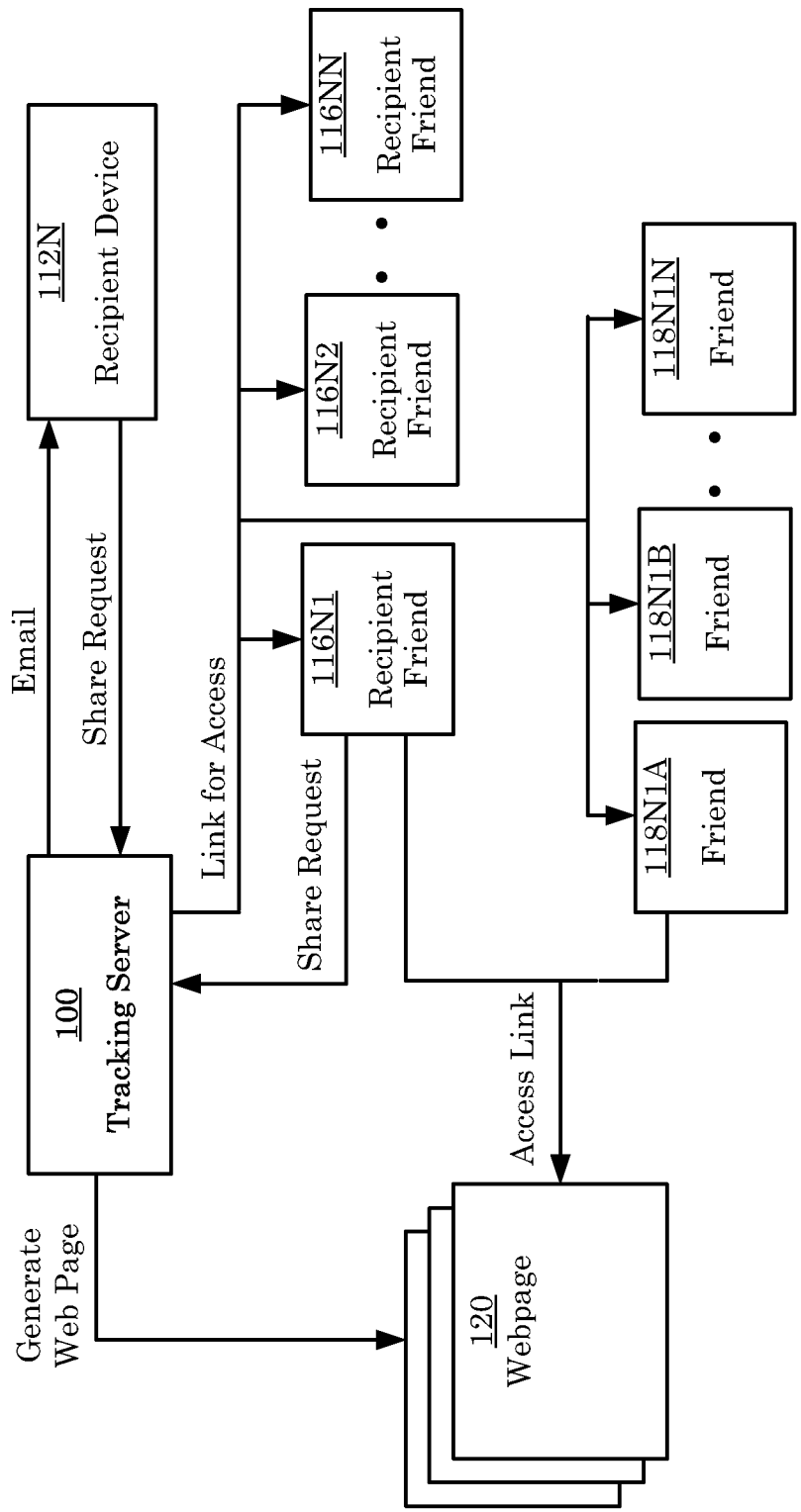
FIG. 6 illustrates a functional block diagram for sharing content by a recipient's friends that can be tracked according to one embodiment of the present invention.

FIG. 6 shows the tracking server 100 from FIG. 1 communicating with recipient device 112N. The tracking server 100 generates an email message that contains content and transmits the email over a network (not shown) to the recipient device 112N. Recipient device 112N is controlled by a recipient that is associated with a recipient identifier stored in a database (not shown) associated with the tracking server 100.

Figure 7:
FIG. 7 is a screen shot of message content according to one embodiment of the present invention.

The email message has a mailing identifier and a recipient identifier and includes content such as an advertisement. An example of content included in the email message is shown in FIG. 7. The content includes links that are selectable by the recipient to share the content through a social networking application and can select which social networking application to share the content. The options for the social networking application shown in FIG. 7 include Bebo™, Delicious™, Digg™, Facebook™, Linkedin™, Myspace™ and Twitter™. The user can select the "Share" icon and select the social networking application to cause a request to share to be transmitted over the network to the tracking server 100.

The mailing identifier is associated with the recipient identifier in the database when the email is transmitted to the recipient device 112N.

Figure 8:
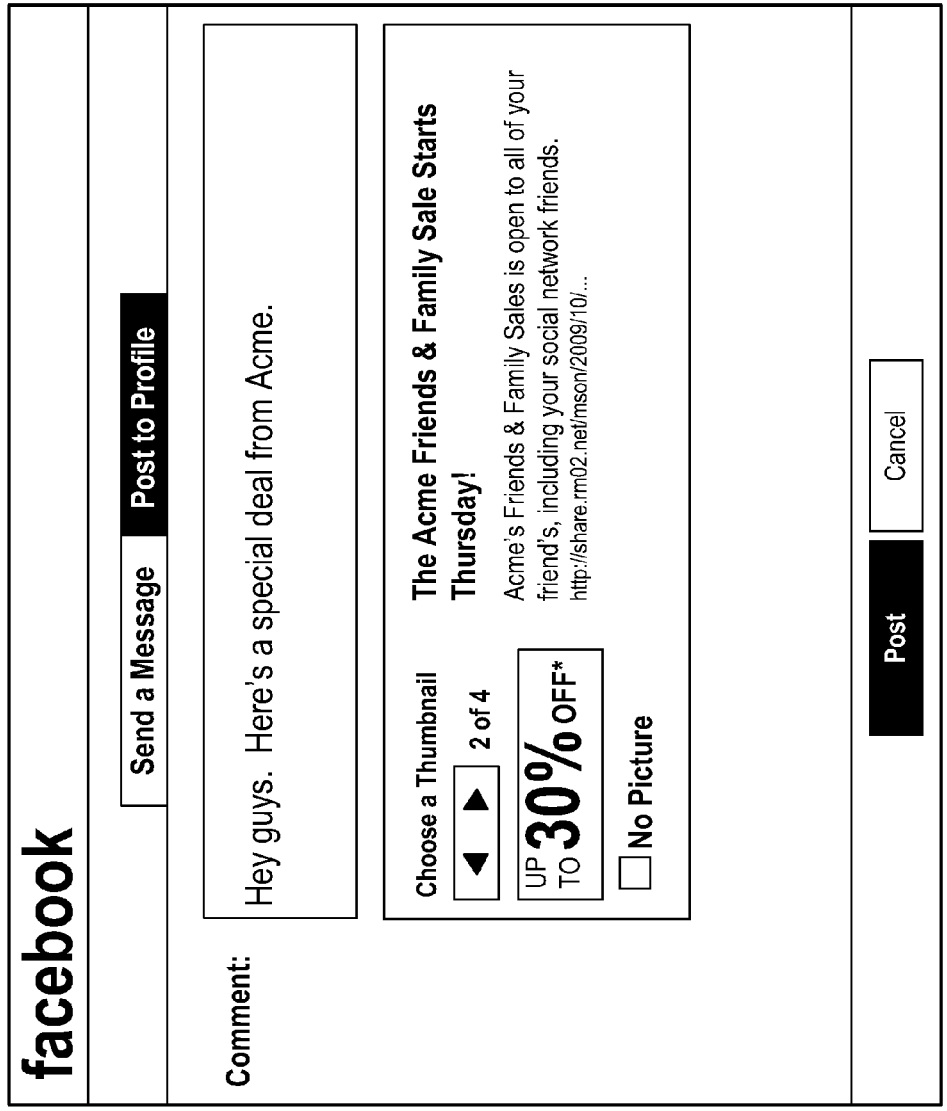
FIG. 8 is a screen shot of a recipient sharing content using a social networking application according to one embodiment of the present invention.

After receiving the share request, the tracking server 100 generates a copy of the content included in the content transmitted to the recipient device 112N and hosts a web page 120 that includes the content at a URL representing the location of the web page 120 on a network. The URL includes the recipient identifier and the mailing identifier. A second recipient identifier that is associated with an anonymous recipient is created and associated with the web page and the recipient identifier. The web page can include the second recipient identifier as an embedded data. The tracking server 100 transmits the link for access to the social networking server (not shown) over the network. The social networking server may display an interface through which the recipient can add comments or other notations to the shared content. An example of an interface is shown in FIG. 8. The illustrated interface is provided by Facebook™, a social networking application. The interface includes a "Comment:" field in which the recipient can add comments or other annotations to the link and allows the recipient to choose a thumbnail, such as a thumbnail generated by the social networking application, to be displayed on the Facebook™ web page that is associated with the recipient.

When the recipient selects the icon labeled "Post" on FIG. 8, the social networking application displays the thumbnail and link for access on the web page associated with the recipient. FIG. 9 is an example of a web page associated with the recipient with the thumbnail and link for access displayed for recipient friends 116N1-116NN to view and access. The link is a hyperlink that includes the URL. When recipient friend 116N1 clicks the link, the web page 120 is transmitted to the computer of the recipient friend 116N1 over a network for display.

Recipient friend 116N1 may elect to share the content on the web page provided by the social networking application and associated with the recipient friend 116N1. The recipient friend 116N1 may access a link provided by the social networking application to share link for access or may access an option that is embedded in the web page 120 to allow the recipient friend 116N1 to share the content through the option. When the recipient friend elects to share the content, an interface may be provided that is similar to the interface shown in FIG. 8 and the thumbnail and link for access appears on the web page associated with recipient friend 116N1 that is provided by the social networking application, similar to the screen shot shown in FIG. 9. A third recipient identifier may be generated and associated with the web page shared by the recipient friend 116N1. The link for access may be accessible to friends of the recipient friend 116N1, such as friends 118N1A-118N1N. The share by recipient friend 116N1 may be stored in the database and associated with the recipient identifier to give the recipient credit for sharing content that was then shared by friends of the recipient.

Friends 118N1A-118N1N of the recipient friend 116N1 can view the thumbnail and link for access. Friends 118N1A-118N1N may not have a relationship on the social networking application with the recipient. If friend 118N1A clicks the link for access, friend 118N1A can access the web page 120 that includes the content. When friend 118N1A access the content, the access may be associated with the recipient identifier in the database to give the recipient credit for the access that was possible because the recipient shared the content. In some embodiments, friend 118N1A may have a relationship with the recipient and recipient friend 116N1 on the social networking application. The social networking application can be configured to provide the friend 118N1A with access to the link through, either or both, of the web page associated with the recipient and the web page associated with the recipient friend 116N1.

Figure 10:
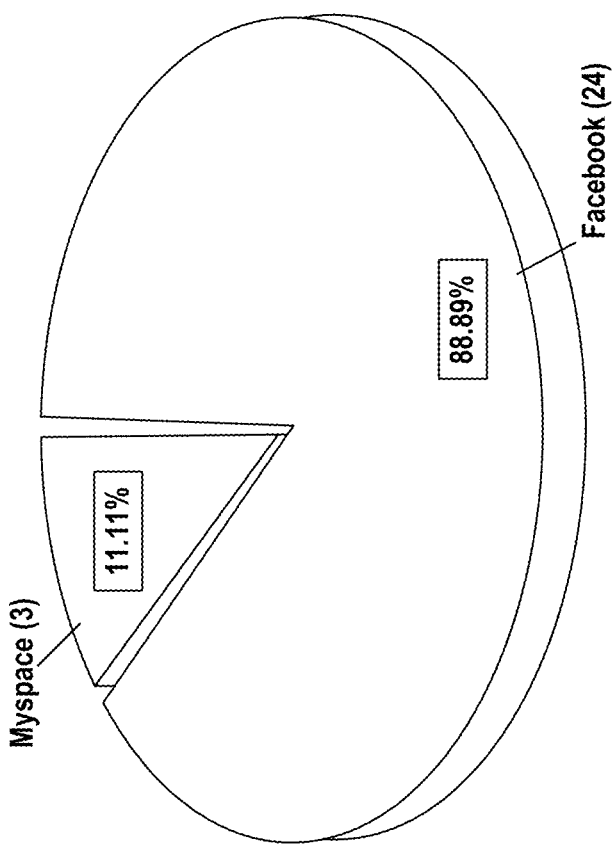
FIG. 10 illustrates a report of shared content according to one embodiment of the present invention.

Tracking when content is shared, accessed, and when embedded links are selected and associating such actions to the original recipient that received an email message can provide information by which an advertising campaign can be measured or planned. FIG. 10 illustrates a report that can be generated based on the information stored in the database through the database associations. The report includes a pie graph that shows the number of times shared content was viewed by recipient friends or friends in the fan out from the recipient and the social networking application used to view the shared content. The chart shows additional detail on the percentage of views and clicks of the shared content on the various social networking applications. For example, the report includes the percentage associated with each social networking application to which the content was shared, the percentage of views of the content on each social networking application, and the percentage of clicks on the content viewed by recipient friends that was received by the tracking server 100. The report can be used to measure the number of individuals or entities that received and clicked on content that included a particular advertisement.

Figure 11:
FIG. 11 illustrates a second embodiment of a report of shared content.

FIG. 11 illustrates another embodiment of a report that can be generated using data and associations stored in the database. The report in FIG. 11 lists recipients by email address and shows the gross total number of messages shared by each recipient. Additional data can be included in the report. Examples of additional data include the number of clicks on the content and the number of times the content was shared by friends of each recipient. This report may be used to target the recipient as someone that is likely to share content by sending messages more frequently, providing incentives, providing rewards, or otherwise.

In another example, the content is provided to the recipient on a web page instead of through an email message. For example, the content may be an article or an advertisement displayed on a web page hosted by an entity such as YAHOO!™ or Google™. The recipient may be a registered member of the entity that has logged into the entity and is browsing web pages hosted by the entity. The content may be associated with an embedded link that allows the recipient to select the link to share the content on a social networking application. The recipient is associated with a recipient identifier and the content is associated with a mailing identifier or an equivalent identifier since the content may not have been mailed to the recipient. A second recipient identifier can be generated and associated with the content and the recipient identifier.

A link to the content can be generated and provided to the social networking application for display on a web page associated with the recipient. The request to share the content can be associated with the recipient identifier in a database. When a recipient friend accesses and shares the content using a link on the web page associated with the recipient, or otherwise, the share is associated with the recipient identifier in the database. A report can be generated that indicates the recipient and the number of times the recipient shared content and the number of times the shared content was shared further. The report can be used to provide the recipient with incentives to view and share content hosted by the entity, to provide the recipient with rewards, or otherwise.

In another example, the content is hosted on a web page by the social networking application. A recipient can view the content and elect to share the content with recipient friends by including a link on the web page associated with the recipient or by forwarding the content or a link to the content in an email message within the social networking application. The share and any further shares by friends because of the share by the recipient can be tracked through database associations similar to those described previously.

The foregoing description of the exemplary embodiments of the invention has been presented only for the purposes of illustration and description and is not intended to be exhaustive or to limit the invention to the precise forms disclosed. Many modifications and variations are possible in light of the above teaching. For example, various identifiers are described as numerical or alphanumerical codes. However, the identifiers may take any form that represents an identifier that can be associated in a database to other identifiers or other data. The embodiments were chosen and described in order to explain the principles of the invention and their practical application to enable others skilled in the art to utilize the invention and various embodiments and with various modifications as are suited to the particular use contemplated. Alternative embodiments will become apparent to those skilled in the art to which the present invention pertains without departing from its spirit and scope.

The invention claimed is:

1. A method comprising:
   transmitting a message comprising content to a recipient, the message having a mailing identifier, an email address for the recipient, and a recipient identifier, the mailing identifier being (i) separate from information in the message, the information comprising the content, one or more email addresses including the email address for the recipient, and transmission time and date, and (ii) independent of the recipient and the recipient identifier, wherein the recipient identifier represents the recipient and is separate from the email address for the recipient;

responsive to transmitting the message, associating the mailing identifier and at least part of the content to the recipient identifier on a computer-readable medium, the recipient identifier being associated with the recipient;

receiving a request from the recipient to share at least part of the content to a social networking application, the request comprising the recipient identifier that is associated with the recipient from which the request is received, the mailing identifier, and an identification of the social networking application;

in response to the request, associating the recipient identifier to a forward identifier on the computer-readable medium and generating a web page comprising at least part of the content, the web page comprising a second recipient identifier and being associated with a sharing link, the second recipient identifier being associated with the forward identifier on the computer-readable medium, wherein the at least part of the content is selected using the recipient identifier and the mailing identifier from the request, wherein the forward identifier indicates that the recipient shared the content and is separate from a second recipient email address;

associating the recipient identifier with the second recipient identifier through the forward identifier on the computer-readable medium;

transmitting at least the sharing link to the social networking application, the sharing link comprising the mailing identifier, the second recipient identifier, and a report identifier;

generating a report based on the recipient identifier being associated with the second recipient identifier through the forward identifier, wherein the report is associated with the report identifier and comprises a representation of the request from the recipient to share at least part of the content and a number of times that the recipient shared the content using the social networking application; and outputting the report.

2. The method of claim 1, further comprising:

receiving a request to access the web page by a recipient friend using the sharing link and the social networking application, wherein the report identifies the request to access the web page by the recipient friend.

3. The method of claim 1, wherein associating the recipient identifier with the second recipient identifier through the forward identifier on the computer-readable medium comprises:

associating the forward identifier with the recipient identifier in a forward request table on the computer-readable medium; and associating the forward identifier with the second recipient identifier in a forward recipients table on the computer-readable medium, wherein the recipient identifier is associated with the second recipient identifier through the forward identifier.

4. The method of claim 3, further comprising:

receiving a request from the recipient friend to share at least part of the content to the social networking application;

generating a third recipient identifier; and receiving a request to access the web page by a friend of the recipient friend using the sharing link and the social networking application;

using a second forward identifier to associate the third recipient identifier with the second recipient identifier on the computer-readable medium, the third recipient identifier being associated with the recipient identifier through the second forward identifier, second recipient identifier, and forward identifier, wherein generating the report comprises generating the report using the recipient identifier associated with the third recipient identifier.

5. The method of claim 4, wherein the report comprises:

a representation of the request from the recipient friend to share at least part of the content to the social networking application; and a representation of the request to access the web page by the friend of the recipient friend using the sharing link and the social networking application.

6. The method of claim 1, further comprising:

generating the message comprising content by accessing data associated with the recipient and using the data to select at least part of the content to formulate content personalized to the recipient, wherein generating the web page comprising at least part of the content comprises replacing the content personalized to the recipient with non-personalized content.

7. A system comprising:

a database comprising a non-transitory computer-readable medium for storing:

a message comprising content associated with a mailing identifier;

a recipient identifier associated with the mailing identifier and at least part of the content;

a web page associated with a sharing link, the sharing link having a second recipient identifier, a mailing identifier and a report identifier;

the second recipient identifier associated with a forward identifier; and the second recipient identifier associated with the recipient identifier through the forward identifier, the forward identifier being adapted to (i) indicate that a recipient associated with the recipient identifier shared the content (ii) be separate from a second recipient email address; and a tracking server device comprising a processor for executing code to cause the tracking server to:

transmit the message comprising the email address for the recipient and the content associated with the mailing identifier to a recipient, wherein the mailing identifier is adapted for being (i) separate from information in the message, the information comprising the content, one or more email addresses including the email address for the recipient, and transmission time and date, and (ii) independent of the recipient and the recipient identifier, wherein the recipient identifier is adapted to be representative of the recipient and separate from the email address for the recipient;

receive a request from the recipient to share at least part of the content to an application, the request comprising the mailing identifier and the recipient identifier that is representative of the recipient from which the request is received;

generate the web page in response to the request, the web page comprising at least part of the content, wherein the tracking server is configured to select the at least part of the content using the recipient identifier and the mailing identifier from the request; and transmit at least the sharing link to the application.

8. The system of claim 7, wherein the tracking server is configured to:

generate a report based on the recipient identifier associated with the second recipient identifier through the forward identifier, wherein the report is associated with the report identifier and comprises a representation of the request from the recipient to share at least part of the content and a number of times that the recipient shared the content using a social networking application or by forwarding the content in an email message using an email application; and output the report.

9. The system of claim 8, wherein the tracking server is configured to receive a request to access the web page by a recipient friend using the sharing link and the application, wherein the report comprises a representation of the request to access the web page by the recipient friend.

10. The system of claim 7, wherein the second recipient identifier associated with the recipient identifier through the forward identifier comprises:

the forward identifier associated with the recipient identifier in a forward request table on the computer-readable medium; and the forward identifier associated with the second recipient identifier in a forward recipients table on the computer-readable medium.

11. The system of claim 7, wherein the tracking server is configured to:

receive a request from the recipient friend to share at least part of the content to the application;

generate a third recipient identifier; and receive a request to access the web page by a friend of the recipient friend using the sharing link and the application, wherein the computer-readable medium comprises:

a third recipient identifier associated with the second recipient identifier using a second forward identifier; and the third recipient identifier associated with the recipient identifier through the second forward identifier, second recipient identifier, and forward identifier.

12. The system of claim 7, wherein the tracking server is configured to generate the message, the message comprising an embedded sharing link that is selectable by the recipient to formulate the request to share at least part of the content to the application, wherein the application is a social networking application.

13. The system of claim 7, wherein the tracking server is configured to generate the message comprising content by accessing data associated with the recipient and using the data to select at least part of the content to formulate content personalized to the recipient, wherein the tracking server is configured to generate the web page by replacing the content personalized to the recipient with non-personalized content.

14. A computer program product stored on a non-transitory computer-readable storage medium, the computer-program product comprising code executable by a processor, the code comprising:

code for transmitting to a recipient a message comprising content, the message having a mailing identifier, an email address for the recipient and a recipient identifier, wherein the mailing identifier is adapted for being (i) separate from information in the message, the information comprising the content, one or more email addresses including the email address for the recipient, and transmission time and date, and (ii) independent of the recipient and the recipient identifier, wherein the recipient identifier is adapted for representing the recipient and being separate from the email address for the recipient;

code for receiving a request from the recipient to share at least part of the content to an application, the request comprising the recipient identifier that is associated with the recipient from which the request is received and the mailing identifier;

code for generating a web page in response to the request, the web page being associated with a sharing link and comprising a second recipient identifier and at least part of the content by selecting the at least part of the content from a database using the recipient identifier and the mailing identifier from the request, the second recipient identifier being associated with a forward identifier in the database, the forward identifier being adapted for indicating that the recipient shared the content and for being separate from a second recipient email address;

code for transmitting at least the sharing link to the application, the sharing link comprising the second recipient identifier, the mailing identifier and a report identifier;

code for receiving a request to access the web page by a recipient friend using the link and the application;

code for associating the request to access the web page by the recipient friend to the recipient identifier in the database;

code for accessing the recipient identifier associated with the forward identifier from the database, the recipient identifier associated with the forward identifier representing the request from the recipient to share at least part of the content to the application;

code for generating a report based on the recipient identifier associated with the forward identifier, the request to access the web page by the recipient friend, and the second recipient identifier, wherein the report is associated with the report identifier and comprises a representation of the request from the recipient to share at least part of the content and the request to access the web page by the recipient friend and a number of times that the recipient shared the content using the social networking application; and code for outputting the report.

15. The computer program product of claim 14, wherein:

code for accessing the recipient identifier associated with the forward identifier from the database comprises code for accessing the recipient identifier associated with the forward identifier in a forward request table in the database; and code for accessing the second recipient identifier associated with the forward identifier from the database comprises code for accessing the second recipient identifier associated with the forward identifier in a forward recipients table in the database, wherein the recipient identifier is associated with the second recipient identifier through the forward identifier.

16. The computer program product of claim 14, further comprising:

code for generating the message, the message comprising an embedded sharing link that is selectable by the recipient to formulate the request to share at least part of the content to the application, wherein the application is a social networking application.

17. The computer-program product of claim 14, further comprising:

code for generating the message comprising content by accessing data associated with the recipient and using the data to select at least part of the content to formulate content personalized to the recipient, wherein code for generating the web page comprises code for replacing the content personalized to the recipient with non-personalized content.

18. The computer-program product of claim 14, further comprising:
   code for identifying the recipient as an influencer based on the recipient identifier associated with the forward identifier and the second recipient identifier associated with the forward identifier.

19. The method of claim 1, wherein the recipient identifier is associated with the email address for the recipient on the computer-readable medium, the mailing identifier and the forward identifier being associated with the email address for the recipient through the association of the recipient identifier with the email address for the recipient.

20. The system of claim 7, wherein the sharing link is a uniform resource locator formed in part by the mailing identifier and the recipient identifier.

* * * * *